United States Patent
Wang et al.

(10) Patent No.: US 11,829,119 B2
(45) Date of Patent: Nov. 28, 2023

(54) FPGA-BASED ACCELERATION USING OPENCL ON FCL IN ROBOT MOTION PLANNING

(71) Applicant: Intel Corporation, Santa Clara, CA (US)

(72) Inventors: Dawei Wang, Beijing (CN); Ling Liu, Beijing (CN); Xuesong Shi, Beijing (CN); Chunjie Wang, Beijing (CN); Ganmei You, Beijing (CN)

(73) Assignee: Intel Corporation, Santa Clara, CA (US)

(*) Notice: Subject to any disclaimer, the term of this patent is extended or adjusted under 35 U.S.C. 154(b) by 352 days.

(21) Appl. No.: 17/256,199

(22) PCT Filed: Dec. 12, 2018

(86) PCT No.: PCT/CN2018/120496
§ 371 (c)(1),
(2) Date: Dec. 26, 2020

(87) PCT Pub. No.: WO2020/118547
PCT Pub. Date: Jun. 18, 2020

(65) Prior Publication Data
US 2021/0263501 A1    Aug. 26, 2021

(51) Int. Cl.
B25J 9/16    (2006.01)
B60W 50/06    (2006.01)
G05B 19/4155    (2006.01)

(52) U.S. Cl.
CPC ........ *G05B 19/4155* (2013.01); *B25J 9/1666* (2013.01); *B60W 50/06* (2013.01);
(Continued)

(58) Field of Classification Search
CPC ........ B25J 9/161; B25J 9/1664; B25J 9/1666; G05B 19/4155; G05B 2219/32386;
(Continued)

(56) References Cited

U.S. PATENT DOCUMENTS

2021/0178591 A1* 6/2021 Floyd-Jones .......... B25J 9/1671

FOREIGN PATENT DOCUMENTS

CN    107206592 A    9/2017
CN    108213757 A    6/2018

OTHER PUBLICATIONS

Alves, et al. "Designing a Collision Detection Accelerator on a Heterogeneous CPU-FPGA Platform", 2017 International Conference on Reconfigurable Computing and FPGAs, IEEE, Dec. 4, 2017, pp. 1-6 (Year: 2017).*

(Continued)

*Primary Examiner* — Spencer D Patton
(74) *Attorney, Agent, or Firm* — Spectrum IP Law Group LLC

(57) ABSTRACT

Methods and apparatus relating to FPGA (Field-Programmable Gate Array) based acceleration in robot motion planning are described. In an embodiment, logic circuitry (such as an FPGA), coupled to a processor, accelerates one or more motion planning operations for a plurality of objects. A first memory, coupled to the logic circuitry, stores data corresponding to a plurality of Oriented Bounding Boxes (OBBs). The plurality of OBBs are to provide Bounding Volume (BV) models for the plurality of objects. Other embodiments are also disclosed and claimed.

23 Claims, 9 Drawing Sheets

(52) U.S. Cl.
CPC ............. *G05B 2219/32386* (2013.01); *G05B 2219/34024* (2013.01); *G05B 2219/50391* (2013.01); *G06T 2210/12* (2013.01); *G06T 2210/21* (2013.01)

(58) Field of Classification Search
CPC ........... G05B 2219/34024; G05B 2219/50391; B60W 50/06; B60W 60/00
See application file for complete search history.

(56) References Cited

OTHER PUBLICATIONS

Kerrek SB, "why buffers should be aligned on 64-byte boundary for best performance?", Stack Overflow, Jan. 18, 2016, https://stackoverflow.com/questions/34860366/why-buffers-should-be-aligned-on-64-byte-boundary-for-best-performance (Year: 2016).*

Pan, et al., "FCL: A General Purpose Library for Collision and Proximity Queries", Robotics and Automation (ICRA), 2012 IEEE International Conference, pp. 3859-3866 (Year: 2012).*

Written Opinion dated Sep. 11, 2019 to PCT Application No. PCT/CN2018/120496.

Doshi et al., "Development of micro-UAV with integration motion planning for open-cut mining surveillance," Microprocessors and Microsystems, 2015, 7 pages.

International Search Report dated Sep. 11, 2019 to PCT Application No. PCT/CN2018/120496.

"Flexible Collision Library," retrieved from https://github.com/flexible-collision-library/fcl on Dec. 5, 2018, pp. 1-4.

Pan, Jia, et al. "FCL: A general purpose library for collision and proximity queries," Robotics and Automation (ICRA), 2012 IEEE International Conference, pp. 3859-3866.

"Arria 10 GX FPGA Development Kit" retrieved from https://www.altera.com/products/boards_and_kits/dev-kits/altera/kit-a10-gx-fpga.html on Dec. 5, 2018, 5 pages.

Pan, Jia, et al., "GPU-based parallel collision detection for fast motion planning," The International Journal of Robotics Research 31 (2), pp. 187-200.

Murray, Sean, et al. "The microarchitecture of a real-time robot motion planning accelerator." Microarchitecture (MICRO), 2016 49th Annual IEEE/ACM International Symposium on. IEEE, 2016.

"Moving robots into the future," MoveIt Motion Planning Framework, pp. 1-10, retrieved from http://moveit.ros.org/ on Feb. 5, 2021.

"ROS 10 Year Montage" retrieved from http://www.ros.org/about-ros/ on Feb. 5, 2021.

Alves, Fredy Augusto M., et al., "Designing a Collision Detection Accelerator on a Heterogenous CPU-FPGA Platform," 2017 International Conference on Reconfigurable Computing and FPGAs, IEEE, Dec. 4, 2017, pp. 1-6.

Anonymous, "A curated list of awesome collision detection libraries and resources," Sep. 7, 2017, pp. 1-2, XP055931643.

Anonymous, "EVGA GeForce GTX 285 Key Features NVIDIA," Oct. 4, 2015, pp. 1-1, XP055931888.

Atay, Nuzhet, et al., "A Motion Planning Processor on Reconfigurable Hardware," 2006 IEEE International Conference on Robotics and Automation (ICRA), May 15, 2006, pp. 125-132, XP010921262.

Choi, Young-kyu, et al., "A Quantitative Analysis on Microarchitectures of Modern CPU-FPGA Platforms," 2016 53rd ACM/AEDAC/IEEE Design Automation Conference (DAC), IEEE, Jun. 5, 2016, pp. 1-6, XP032945319.

Extended European Search Report dated Jun. 27, 2022 for EP Application No. 18942957.4, 18 pages.

Fender, Joshua, et al., "A High-Speed Ray Tracing Engine Built on a Field-Programmable System," Field Programmable Technology (FPT), 2003 IEEE International Conference, Dec. 15, 2003, pp. 188-195, XP010688335.

Gottschalk, S, et al., OBB-Tree: A Hierarchical Structure for Rapid Interference Detection, SIGGRAPH ;96: Proceedings of the 23rd Annual Conference on Computer Graphics and Interactive Techniques, Aug. 1, 1996, pp. 1-25, XP055931973.

Lauterbach, C., et al., "gProximity: Hierarchical GPU-Based Operations for Collision and Distance Queries," Computer Graphics Forum: Journal of the European Association for Computer Graphics, vol. 29, No. 2, Jun. 7, 2010, pp. 419-428.

Murray, Sean, et al., "Robot Motion Planning on a Chip," Robotics: Science and Systems XII, Jan. 1, 2016, pp. 1-9, XP055931146.

Murray, Sean, et al., "The Microarchitecture of a Real-Time Robot Motion Planning Accelerator," 2016 49th Annual IEEE/ACM International Symposium on Microarchitecture, Oct. 15, 2016, pp. 1-12, XP033022491.

Sudha, N., "Hardware-Efficient Image-Based Robotic Path Planning in a Dynamic Environment and its FPGA Implementation," IEEE Transactions on Industrial Electronics, vol. 58, No. 5, May 1, 2011, pp. 1907-1920, XP011352908.

Zhang, Zhaorui, et al., "FPGA-Based High-Performance Collision Detection: An Enabling Technique for Image-Guided Robotic Surgery," Frontiers in Robotics and AI, vol. 3, Aug. 31, 2016, 14 pages.

* cited by examiner

FPGA-BASED ACCELERATION USING OPENCL ON FCL IN ROBOT MOTION PLANNING

FIELD

The present disclosure generally relates to the field of electronics. More particularly, an embodiment relates to FPGA (Field-Programmable Gate Array) based acceleration in robot motion planning.

BACKGROUND

A fundamental robotics task is to plan collision-free motions for complex bodies from a start position to a goal position. As an example, "motion" and "path" planning was the most occurred keyword on International Conference on Intelligent Robots (IROS) 2017 (the most recent top tier conference on robotics).

However, performing tasks associated with robot motion planning can be very compute intensive. As a result, acceleration of such tasks can improve the overall usability and functionality of robotic systems.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, one fundamental robotics task is to plan collision-free motions for complex bodies from a start position to a goal position. However, performing tasks associated with robot motion planning can be very compute intensive. One of the most common software stacks used for robot motion planning may include the combination of ROS (that refers to the Robot Operating System which includes a set of software libraries and tools that help in building robot applications), MoveIt! (which is a software platform used for mobile manipulation and motion planning), and FCL. FCL refers to Flexible Collision Library which is used for collision checking during planning, and usually takes the most amount of Central Processing Unit (CPU) time to execute robot motion planning tasks.

To this end, some embodiments relate to FPGA (Field-Programmable Gate Array) based acceleration in robot motion planning. In an embodiment, an FPGA (or other hardware logic circuitry) is used to accelerate robot motion planning by executing (e.g., OpenCL™) operations/instructions on Flexible Collision Library (FCL). Moreover, to solve the issue of CPU time-consumption, one embodiment utilizes an FPGA (e.g., as a co-processor) to accelerate the FCL related operations. The acceleration may be deployed on an Arria® 10 GX FPGA Development Kit developed using OpenCL (such as provided by Intel® Corporation of Santa Clara, Calif., USA). For example, the collision checking average time can be improved from 0.086 ms to 0.045 ms, which is 1.9× times speedup relative to a pure CPU operated solution (e.g., using an Core™ i5-7600 processor also provided by Intel® Corporation). Furthermore, some embodiments can be easy to deploy as a plug-a-board on the robot system.

Figure 1:
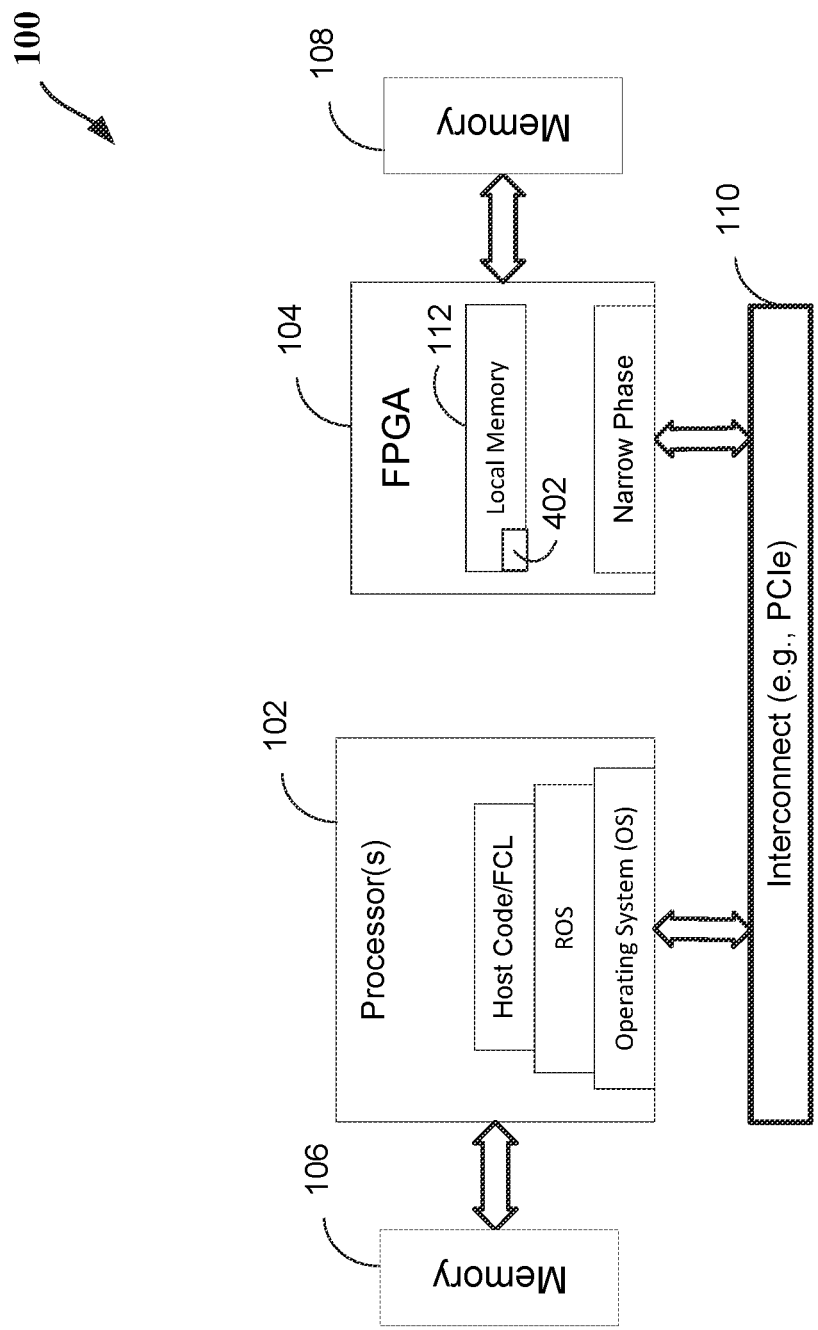
FIG. 1 illustrates a block diagram of a system for FPGA-based acceleration in robot motion planning, according to an embodiment.

FIG. 1 illustrates a block diagram of a system 100 for FPGA-based acceleration in robot motion planning, according to an embodiment. System 100 provides a software and hardware framework to accelerate performance of tasks associated with robot motion planning.

In robotics, the collision detection bottleneck can comprise 99% of the time spent on motion planning. Generally, there can be two phases for each collision checking task: in the broad-phase, quick and coarse collision checking is performed for each pair of rigid bodies (e.g., based on their bounding boxes) to determine potential collision between the two bodies; and then during the narrow-phase, precise collision checking is performed (e.g., only) for those pairs of rigid bodies that did not pass the broad-phase checking (where not passing the broad phase indicates a collision between the pairs has occurred or a collision has not been ruled out by the broad phase).

Referring to FIG. 1, system 100 includes one or more processors 102 (which could be any type of a processor, including a GPU, a CPU, etc. such as those discussed herein with reference to FIGS. 5-8), an FPGA 104, one or more memory devices 106/108 (which could be any type of volatile or non-volatile memory discussed herein, including DRAM (Dynamic Random Access Memory), DDR (Double Data Rate) memory, etc.), and one or more interconnect(s) 110 to facilitate communication between various components of system 100 or component(s) external to the system 100. For example, memory 106/108, processor(s) 102, FPGA 104, etc. may communicate with each other via one or more interconnects (such as interconnects provided in accordance with the Peripheral Component Interconnect (PCI) or more specifically PCI express (PCIe) Specification, e.g., Revision 3.0, Nov. 10, 2010, Revision 4.0, Nov. 29, 2011, Revision 5.0, June 2017, et seq.).

As shown, processor 102 executes various software such as host code/FCL, ROS, OS, etc. FPGA 104 includes local memory 112 (which may be used as a cache to store various information including Node Stack information 402 as further discussed below, e.g., with reference to FIGS. 3A, 3B, and 4). Any type of volatile or non-volatile memory such as those discussed herein can be used for local memory 112 (including for example Random Access Memory (RAM), DDR, DRAM etc.). FPGA 104 performs the narrow-phase tasks/operations, e.g., after initiations or deployment of the broad-phase tasks/operations.

Moreover, some embodiments accelerate the collision detection operations considering three aspects. The first is the re-designed processing flow that the narrow-phase process (e.g., only) launches (e.g., on the FPGA) after the (for example, entire) broad-phase processing is done (e.g., on the CPU/processor). The second is a proposed prefetching scheme that uses local memory 112 on the FPGA as a cache to buffer the data from memory 108. In turn, the local memory can use the available high on-chip bandwidth for faster and/or less power-consumption intensive communication. The last is an algorithm optimization by making full use of the property of pipeline and parallelism of the FPGA to enhance performance.

Furthermore, due to the power consumption limitations, solutions based on GPU (Graphics Processing Unit) and/or CPU alone are not generally suitable for the robot embedded systems. Also, an RTL (Register-Transfer Level) based microarchitecture can be time consumption intensive for the algorithm development and evolution.

In an embodiment, a sample robot used may have one or more arms, where each arm of the robot has 7 degrees of freedom. One embodiment works on the collision detection of the one or more arms and the robot itself. Various components discussed herein (such as those of FIG. 1), a power source (such as one or more batteries), and/or sensor(s) (e.g., radar, camera, LIDAR (Light Detection And Ranging), etc.) may be provided as components of a robot or (e.g., autonomous) vehicle. Furthermore, while some embodiments are discussed with reference to a robot or robot motion, the same or similar embodiments may also be mounted or otherwise physically coupled to a vehicle to facilitate collision avoidance, motion planning, etc. by the vehicle.

As discussed herein, a "vehicle" generally refers to any transportation device capable of being operated autonomously (with little or no human/driver intervention), such as an automobile, a truck, a motorcycle, an airplane, a helicopter, a vessel/ship, a train, a drone, etc. whether or not the vehicle is a passenger or commercial vehicle, and regardless of the power source type (such as one or more of: fossil fuel(s), solar energy, electric energy, chemical energy, nuclear energy, etc.) and regardless of the physical state of the power source (e.g., solid, liquid, gaseous, etc.) used to move the vehicle.

Figure 2:
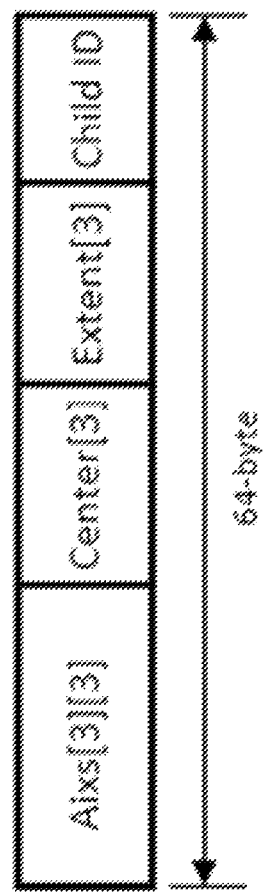
FIG. 2 illustrates an Oriented Bounding Box (OBB) data structure, according to an embodiment.

FIG. 2 illustrates an Oriented Bounding Box (OBB) data structure 200, according to an embodiment. The OBB data structure 200 is aligned by 64-byte. An embodiment focuses on the acceleration of narrow-phase on FPGA. In an embodiment, the data structure used for collision detection is based on Bounding Volume Hierarchies (BVHs), where the Oriented Bounding Boxes (OBBs) are chosen as the BV (Bounding Volume) to present or model the object. BVH is built for each triangular mesh model, and a BVH is a full binary tree where each node stores an OBB. In FIG. 2, Axis[3]][3] is the unit vector representing the x, y, z axis, Center[3] refers to coordinate position of the center, Extent[3] is the computed extension based on two axis, and Child ID refers to where the BVH is a binary tree and a non-leaf node could have a left child and a right child (every child has a ID).

As mentioned above, some embodiments accelerate the collision detection operations considering three aspects. The first is the re-designed processing flow that the narrow-phase process launches in the FPGA (e.g., only) after the (for example, entire) broad-phase processing is done on the CPU/processor. The second is a proposed prefetching scheme that uses local memory 112 on the FPGA as a cache to buffer the data from memory 108. In turn, the local memory can use the available high on-chip bandwidth for faster and/or less power-consumption intensive communication. The last is an algorithm optimization by making full use of the property of pipeline and parallelism of the FPGA to enhance performance.

As for the process flow, in contrast to some current solutions where the broad-phase process alternates with the narrow-phase process in FCL, an embodiment starts the narrow-phase process (e.g., only) upon completion of (e.g., all) the broad-phase requests. For example, the broad-phase process is deployed/initiated on CPU, and the narrow-phase is deployed on FPGA (e.g., to be executed/completed/accelerated by the FPGA). Hence, all the narrow-phase requests are transferred from CPU to FPGA once the kernel (in the FPGA) is launched by the host (CPU). This can reduce the time spent for copying data from CPU to FPGA and saves the interconnect setup time. Moreover, in order to meet the demand of the data transmission, the OBB data structure can be re-organized by aligning the data with 64-byte, as shown in FIG. 2.

As for the prefetching scheme, in at least one embodiment, because of the local memory's (e.g., memory 112) higher available bandwidth and/or reduced potential power consumption than global/main/external memory (e.g., memory 108), on-chip local memory (e.g., memory 112) is used as cache to buffer the first 16 OBB data of every model (and there are 26 models in some embodiments). Every model may be similar to a binary tree, and the first 16 nodes are buffered in the cache 112. Depending on the test performance, 16 OBB data can be used, because, along with the size of cache becoming larger, it will lower the kernel execution frequency. Also, the total access to the first 16 OBBs (of all the 26 models) may occupy about 10.2% of all the access, so the performance can be improved to some extent.

Figure 3A:
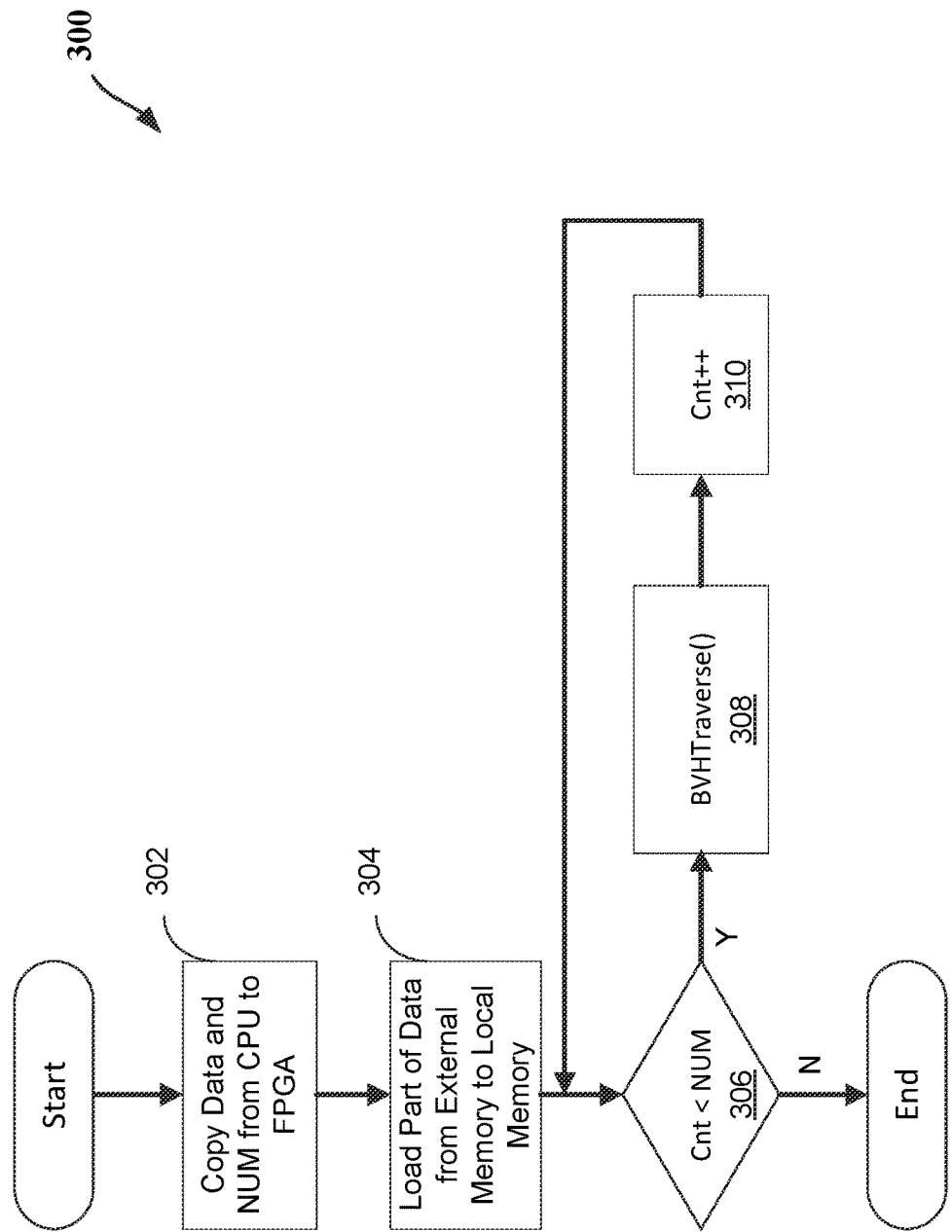
FIG. 3A illustrates a flow chart of a method for acceleration on an FPGA, according to an embodiment.
Figure 3B:
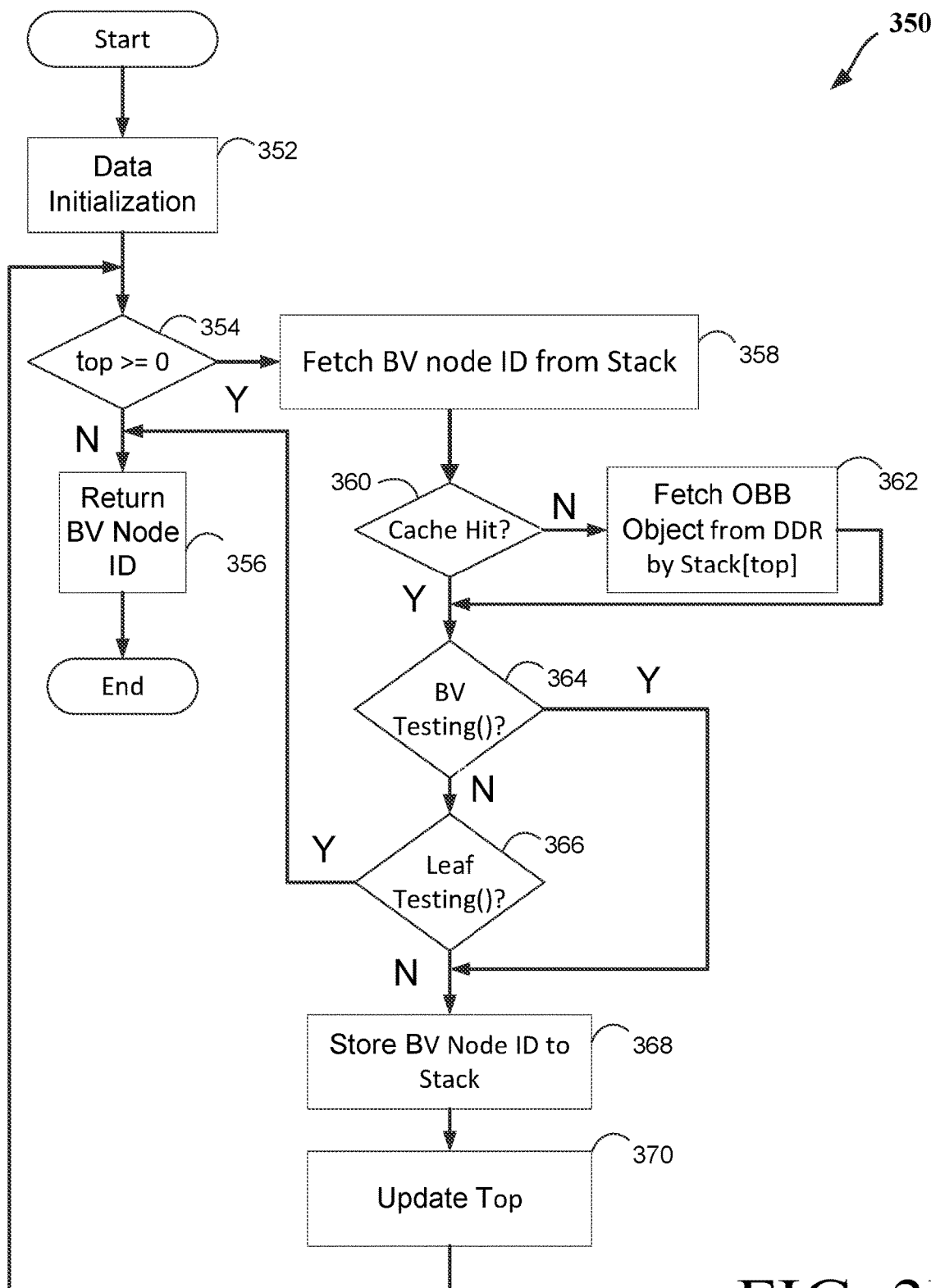
FIG. 3B illustrates a flow chart of a method to perform BVH traverse function, according to one embodiment.
Figure 4:
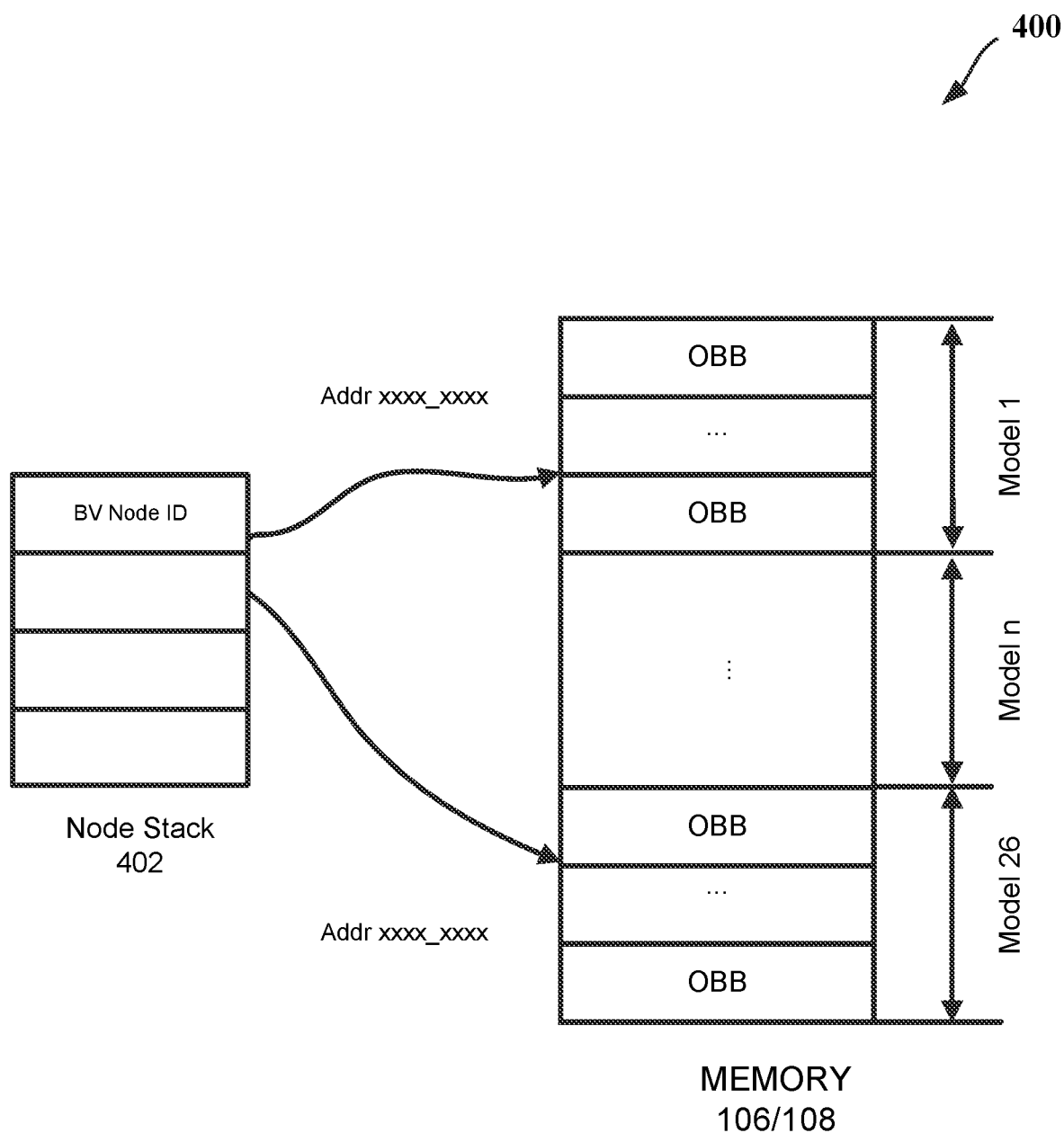
FIG. 4 illustrates a map of the relationship between a Node Stack and external/main memory, according to an embodiment.

FIG. 3A illustrates a flow chart of a method 300 for acceleration on an FPGA, according to an embodiment. FIG. 3B illustrates a flow chart of a method 350 to perform BVH traverse function, according to one embodiment. FIG. 4 illustrates a map 400 of the relationship between a Node Stack and external/main memory, according to an embodiment. In various embodiments, one or more components discussed with reference to FIGS. 1 and/or 4 are used to perform the operation(s) of methods 300 and/or 350.

Referring to FIGS. 3A and 4, at operation 302, data is copies from the processor/CPU 102 (or from its associated memory such as memory 106) to the FPGA (or its associated memory such as memory 108). Operation 302 may also copy a threshold value/number (NUM), where NUM indicates the threshold/maximum number of traversals of the binary BVH tree, depending on the implementation. Operation 304 loads all or part of the data from the external memory (e.g., memory 108) to the local memory (e.g., memory 112), e.g., so the local memory can be used as a cache for FPGA operations. Operation 306 determines whether the threshold number of traversals has been reached by comparing a count value (Cnt) and the NUM value. Operation 308 performs the BVH traversal to detect optional collisions between objects. Operation 310 increments the count value (e.g., by 1).

Hence, in the kernel (which may be executed on the FPGA 104, e.g., in accordance with OpenCL), all the narrow-phase requests are responded to. The core algorithm is referred to as BVH Traverse, which functions to traverse the binary BVH tree built with DFS (Depth First Search) to return the collision result(s), and if there is a collision, the corresponding BV node ID is returned, as further discussed with reference to FIG. 3B.

Referring to FIGS. 3B and 4, operation 352 initializes the data such as data stored in memories 106 and/or 108. Operation 354 determines whether there are more node information to fetch (e.g., by comparing a top of stack pointer (top) to a threshold value like 0). If no more node information is to be fetched, operation 356 returns the BV node identifier (ID). Otherwise, operation 358 starts the process for fetching the BV node ID for Node Stack 402 from the stack stored information in memory 108. Operation 360 determines whether there is a hit in the cache 112. If not, operation 362 fetches the OBB object from memory 108 using the top pointer. Operation 364 performs BV testing (where BV testing determines whether the two nodes are disjoint or not; if the two nodes are disjoint (i.e., no collision), method 350 skips to operation 368). Operation 366 performs binary tree leaf testing (e.g., to determine whether the two nodes are both leafs; if they are leafs and joint (i.e., indicating a collision), the BVH Traverse( ) operation will stop and return BV node ID at operation 356). Operation 368 stores the BV node ID to the Node Stack 402. Operation 370 updates the stack pointer top.

Moreover, when searching the BVH binary tree with DFS from two target models (e.g., selected from the 26 models), the intermediate BV node IDs are pushed into the Node Stack 402, which is stored in local memory in FPGA in order to make full use of the high bandwidth of local memory. The ID element in the stack corresponds to the offset address of every model in the external memory 108 such that the target OBB object can be fetched from the external/global memory 108, shown in FIG. 4. Also, the strategy of pipeline and parallelism are applied, and data is pre-fetched from the global memory sequentially (pipeline) in order to avoid potential port arbitration, and the computation is unrolled to make the most of the DSP resources on FPGA.

In an embodiment, Table 1 show resource usage and clock frequency for implementing at least one embodiment (e.g., on a Arria® 10 1150 device. ALUTs refers to Adaptive Look-Up Tables.

TABLE 1

| ALUTs | Registers | RAMS | DSPs | Frequency |
|---|---|---|---|---|
| 220.4K (28%) | 288.6K (18%) | 597 (%24) | 357 (24%) | 230.0 MHz |

As shown in Table 1, the occupied sources on FPGA Arria 10 1150 device is not so large, so that the algorithm could be implemented on smaller FPGA, such as Statix V series.

Figure 5:
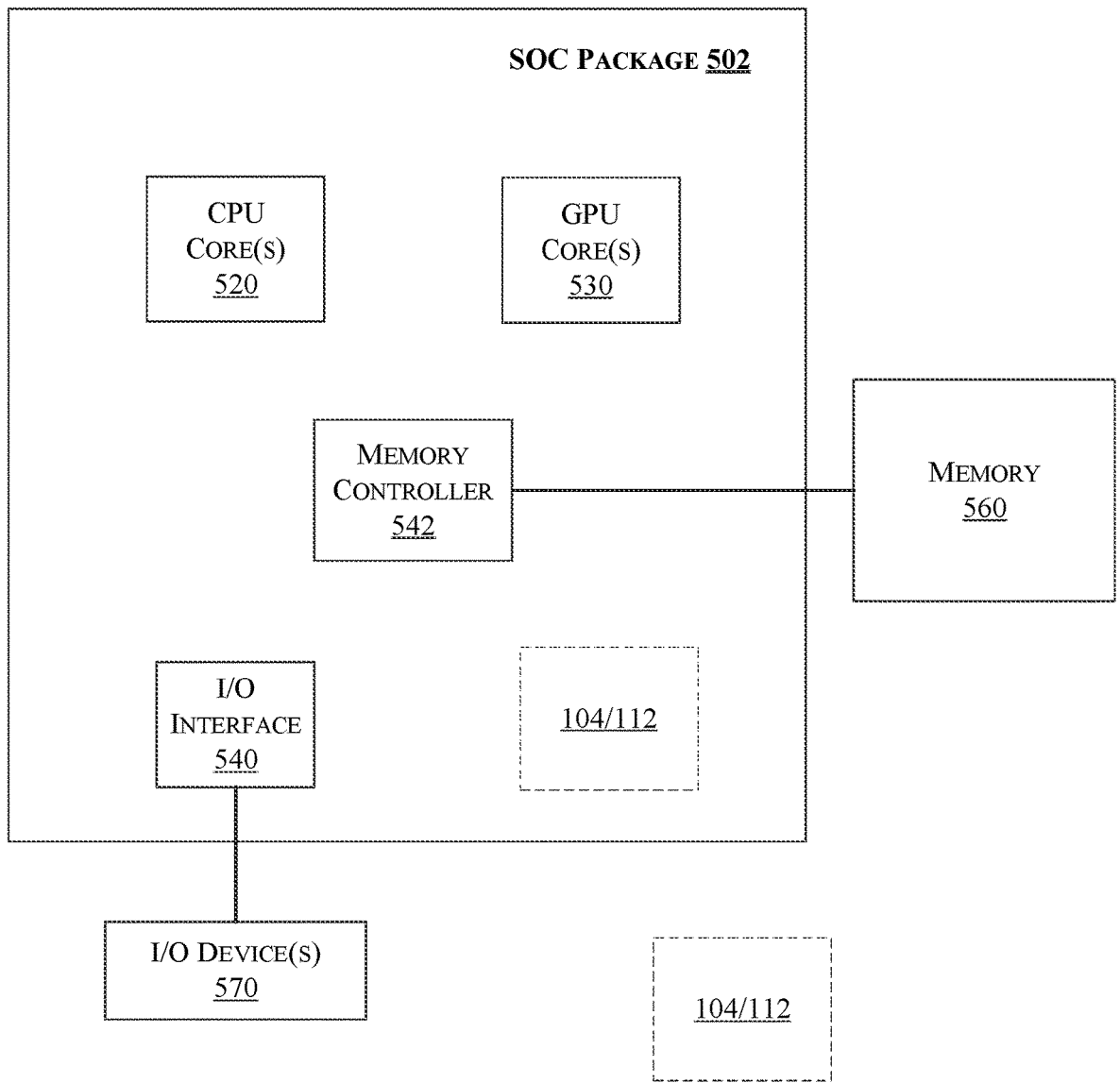
FIGS. 5 and 6 illustrates block diagrams of embodiments of computing systems, which may be utilized in various embodiments discussed herein.

FIG. 5 illustrates a block diagram of an SOC package in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 520 may include one or more other components, e.g., as discussed with reference to the other figures herein. In one embodiment, SOC package 502 (and its components) is provided on one or more Integrated Circuit (IC) die, e.g., which are packaged into a single semiconductor device.

As illustrated in FIG. 5, SOC package 502 is coupled to a memory 560 via the memory controller 542. In an embodiment, the memory 560 (or a portion of it) can be integrated on the SOC package 502.

The I/O interface 540 may be coupled to one or more I/O devices 570, e.g., via an interconnect and/or bus such as discussed herein with reference to other figures. I/O device (s) 570 may include one or more of a keyboard, a mouse, a touchpad, a display, an image/video capture device (such as a camera or camcorder/video recorder), a touch screen, a speaker, or the like.

Figure 6:
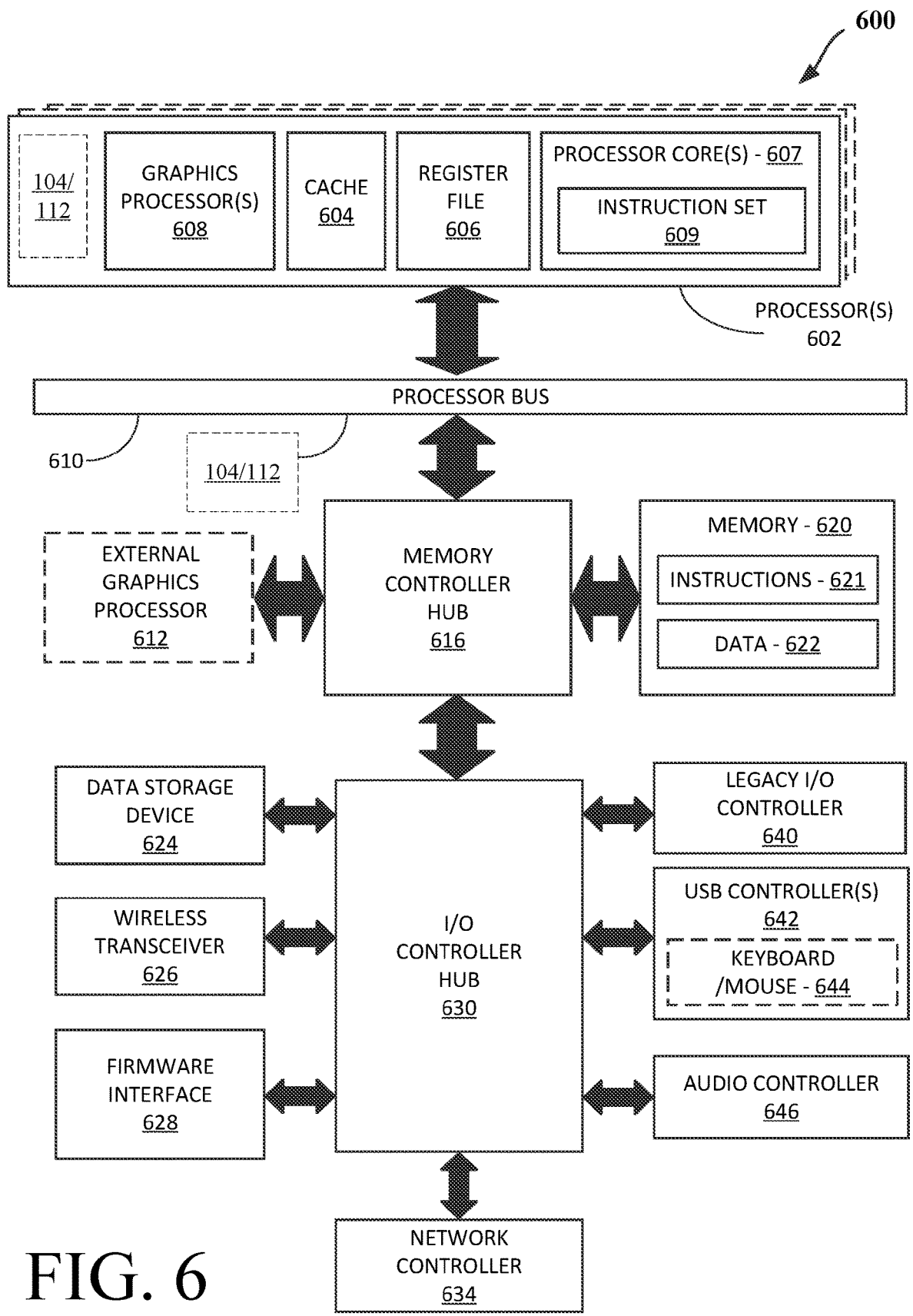

FIG. 6 is a block diagram of a processing system 600, according to an embodiment. In various embodiments the system 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC or SOC) integrated circuit for use in mobile, handheld, or embedded devices.

An embodiment of system 600 can include, or be incorporated within a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, processor 602 is coupled to a processor bus 610 to transmit communication signals such as address, data, or control signals between processor 602 and other components in system 600. In one embodiment the system 600 uses an exemplary 'hub' system architecture, including a memory controller hub 616 and an Input Output (I/O) controller hub 630. A memory controller hub 616 facilitates communication between a memory device and other components of system 600, while an I/O Controller Hub (ICH) 630 provides connections to I/O devices via a local I/O bus. In one embodiment, the logic of the memory controller hub 616 is integrated within the processor.

Memory device 620 can be a dynamic random access memory (DRAM) device, a static random access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations.

In some embodiments, ICH 630 enables peripherals to connect to memory device 620 and processor 602 via a high-speed I/O bus. The I/O peripherals include, but are not limited to, an audio controller 646, a firmware interface 628, a wireless transceiver 626 (e.g., Wi-Fi, Bluetooth), a data storage device 624 (e.g., hard disk drive, flash memory, etc.), and a legacy I/O controller 640 for coupling legacy (e.g., Personal System 2 (PS/2)) devices to the system. One or more Universal Serial Bus (USB) controllers 642 connect input devices, such as keyboard and mouse 644 combinations. A network controller 634 may also couple to ICH 630. In some embodiments, a high-performance network controller (not shown) couples to processor bus 610. It will be appreciated that the system 600 shown is exemplary and not limiting, as other types of data processing systems that are differently configured may also be used. For example, the I/O controller hub 630 may be integrated within the one or more processor 602, or the memory controller hub 616 and I/O controller hub 630 may be integrated into a discreet external graphics processor, such as the external graphics processor 612.

Figure 7:
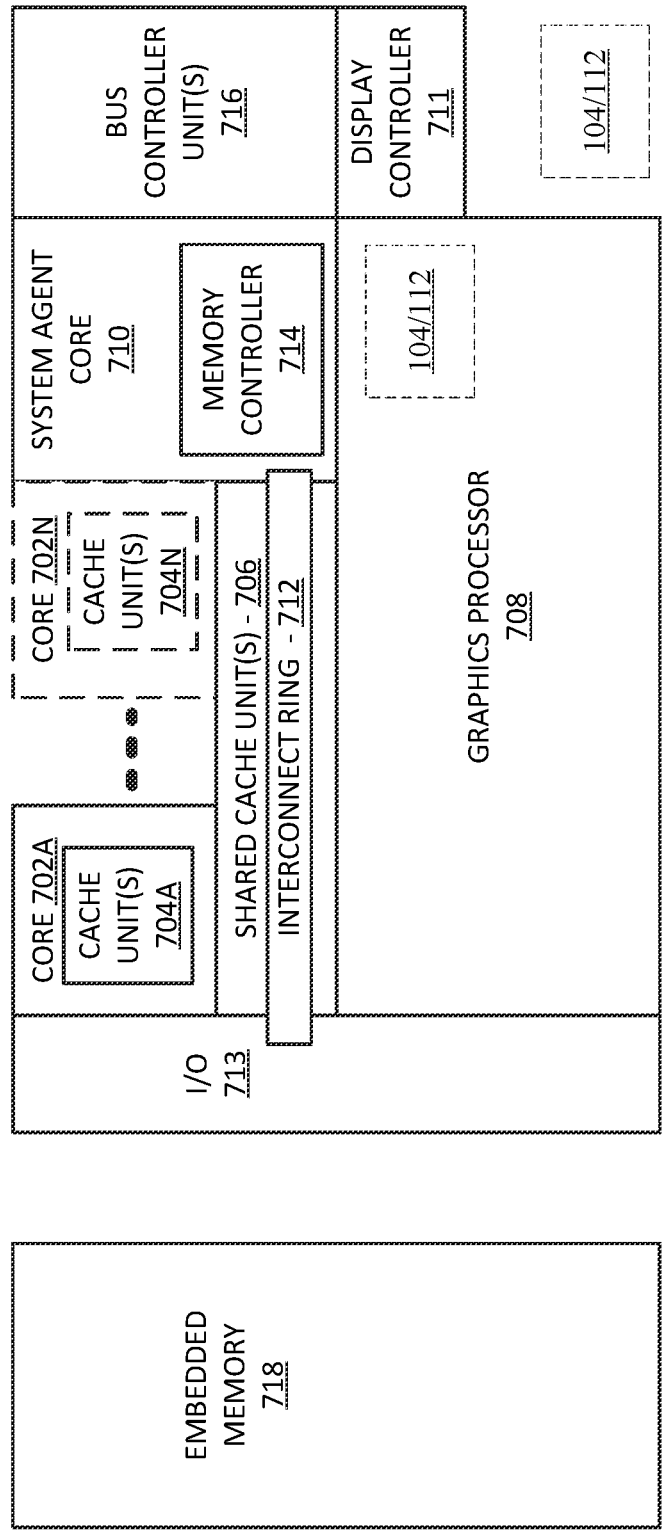
FIGS. 7 and 8 illustrate various components of processers in accordance with some embodiments.

FIG. 7 is a block diagram of an embodiment of a processor 700 having one or more processor cores 702A to 702N, an integrated memory controller 714, and an integrated graphics processor 708. Those elements of FIG. 7 having the same reference numbers (or names) as the elements of any other figure herein can operate or function in any manner similar to that described elsewhere herein, but are not limited to such. Processor 700 can include additional cores up to and including additional core 702N represented by the dashed lined boxes. Each of processor cores 702A to 702N includes one or more internal cache units 704A to 704N. In some embodiments each processor core also has access to one or more shared cached units 706.

The internal cache units 704A to 704N and shared cache units 706 represent a cache memory hierarchy within the processor 700. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 706 and 704A to 704N.

In some embodiments, processor 700 may also include a set of one or more bus controller units 716 and a system agent core 710. The one or more bus controller units 716 manage a set of peripheral buses, such as one or more Peripheral Component Interconnect buses (e.g., PCI, PCI Express). System agent core 710 provides management functionality for the various processor components. In some embodiments, system agent core 710 includes one or more integrated memory controllers 714 to manage access to various external memory devices (not shown).

In some embodiments, one or more of the processor cores 702A to 702N include support for simultaneous multi-threading. In such embodiment, the system agent core 710 includes components for coordinating and operating cores 702A to 702N during multi-threaded processing. System agent core 710 may additionally include a power control unit (PCU), which includes logic and components to regulate the power state of processor cores 702A to 702N and graphics processor 708.

In some embodiments, processor 700 additionally includes graphics processor 708 to execute graphics processing operations. In some embodiments, the graphics processor 708 couples with the set of shared cache units 706, and the system agent core 710, including the one or more integrated memory controllers 714. In some embodiments, a display controller 711 is coupled with the graphics processor 708 to drive graphics processor output to one or more coupled displays. In some embodiments, display controller 711 may be a separate module coupled with the graphics processor via at least one interconnect, or may be integrated within the graphics processor 708 or system agent core 710.

In some embodiments, a ring based interconnect unit 712 is used to couple the internal components of the processor 700. However, an alternative interconnect unit may be used, such as a point-to-point interconnect, a switched interconnect, or other techniques, including techniques well known in the art. In some embodiments, graphics processor 708 couples with the ring interconnect 712 via an I/O link 713.

The exemplary I/O link 713 represents at least one of multiple varieties of I/O interconnects, including an on package I/O interconnect which facilitates communication between various processor components and a high-performance embedded memory module 718, such as an eDRAM (or embedded DRAM) module. In some embodiments, each of the processor cores 702 to 702N and graphics processor 708 use embedded memory modules 718 as a shared Last Level Cache.

In some embodiments, processor cores 702A to 702N are homogenous cores executing the same instruction set architecture. In another embodiment, processor cores 702A to 702N are heterogeneous in terms of instruction set architecture (ISA), where one or more of processor cores 702A to 702N execute a first instruction set, while at least one of the other cores executes a subset of the first instruction set or a different instruction set. In one embodiment processor cores 702A to 702N are heterogeneous in terms of micro-architecture, where one or more cores having a relatively higher power consumption couple with one or more power cores having a lower power consumption. Additionally, processor 700 can be implemented on one or more chips or as an SoC integrated circuit having the illustrated components, in addition to other components.

Figure 8:
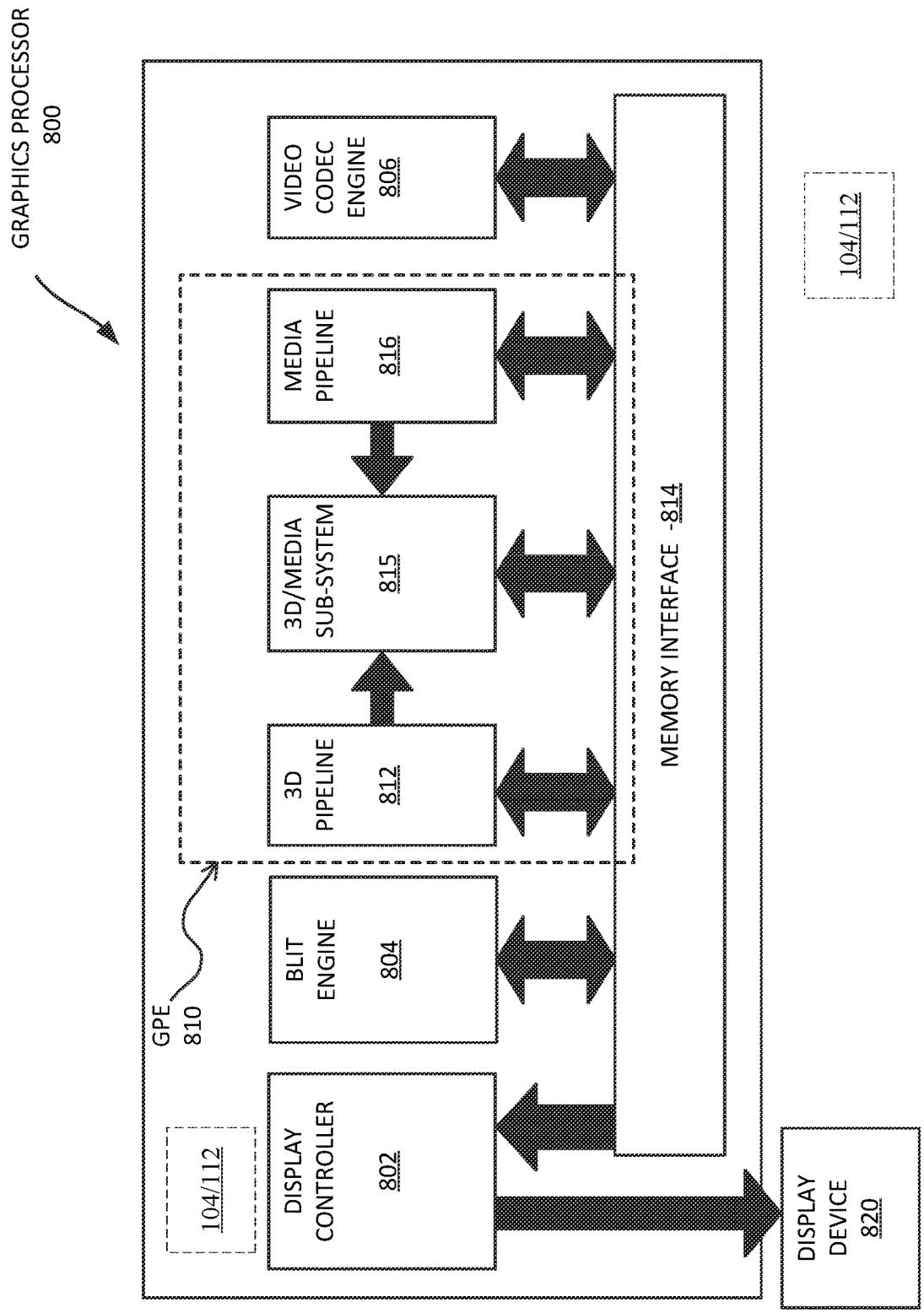

FIG. 8 is a block diagram of a graphics processor 800, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 800 includes a memory interface 814 to access memory. Memory interface 814 can be an interface to local memory, one or more internal caches, one or more shared external caches, and/or to system memory.

In some embodiments, graphics processor 800 also includes a display controller 802 to drive display output data to a display device 820. Display controller 802 includes hardware for one or more overlay planes for the display and composition of multiple layers of video or user interface elements. In some embodiments, graphics processor 800 includes a video codec engine 806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 800 includes a block image transfer (BLIT) engine 804 to perform two-dimensional (2D) rasterizer operations including, for example, bit-boundary block transfers. However, in one embodiment, 8D graphics operations are performed using one or more components of graphics processing engine (GPE) 810. In some embodiments, graphics processing engine 810 is a compute engine for performing graphics operations, including three-dimensional (3D) graphics operations and media operations.

In some embodiments, GPE 810 includes a 3D pipeline 812 for performing 3D operations, such as rendering three-dimensional images and scenes using processing functions that act upon 3D primitive shapes (e.g., rectangle, triangle, etc.). The 3D pipeline 812 includes programmable and fixed function elements that perform various tasks within the element and/or spawn execution threads to a 3D/Media sub-system 815. While 3D pipeline 812 can be used to perform media operations, an embodiment of GPE 810 also includes a media pipeline 816 that is specifically used to perform media operations, such as video post-processing and image enhancement.

In some embodiments, media pipeline 816 includes fixed function or programmable logic units to perform one or more specialized media operations, such as video decode acceleration, video de-interlacing, and video encode acceleration in place of, or on behalf of video codec engine 806. In some embodiments, media pipeline 816 additionally includes a thread spawning unit to spawn threads for execution on 3D/Media sub-system 815. The spawned threads perform computations for the media operations on one or more graphics execution units included in 3D/Media subsystem 815.

In some embodiments, 3D/Media subsystem 815 includes logic for executing threads spawned by 3D pipeline 812 and media pipeline 816. In one embodiment, the pipelines send thread execution requests to 3D/Media subsystem 815, which includes thread dispatch logic for arbitrating and dispatching the various requests to available thread execution resources. The execution resources include an array of graphics execution units to process the 3D and media threads. In some embodiments, 3D/Media subsystem 815 includes one or more internal caches for thread instructions and data. In some embodiments, the subsystem also includes shared memory, including registers and addressable memory, to share data between threads and to store output data.

The following examples pertain to further embodiments. Example 1 includes an apparatus comprising: logic circuitry, coupled to a processor, to accelerate one or more motion planning operations for a plurality of objects, wherein the one or more motion planning operations are to be initiated by the processor; and a first memory, coupled to the logic circuitry, to store data corresponding to a plurality of Oriented Bounding Boxes (OBBs), wherein the plurality of OBBs are to provide Bounding Volume (BV) models for the plurality of objects. Example 2 includes the apparatus of example 1, wherein a Field-Programmable Gate Array (FPGA) comprises the logic circuitry and a local memory. Example 3 includes the apparatus of any one of examples 1 to 2, wherein a portion of data stored in the first memory is to be transferred to the local memory on the FPGA prior to performance of the one or more motion planning operations. Example 4 includes the apparatus of any one of examples 1 to 3, wherein the local memory is to store a node stack, wherein the node stack comprises BV node identifier information. Example 5 includes the apparatus of any one of examples 1 to 4, wherein the local memory of the FPGA is to cache at least a first 16 OBBs of each of the BV models. Example 6 includes the apparatus of any one of examples 1 to 5, wherein the one or more motion planning operations are to be performed in at least two phases, wherein a first phase comprises a coarse collision checking task to be performed for each pair of bodies to determine potential collision between the two bodies, wherein a second phase comprises a precise collision checking task for those pairs of bodies that failed to pass the first phase. Example 7 includes the apparatus of any one of examples 1 to 6, wherein the second phase is to be launched for processing by the logic circuitry after processing of the first phase has been completed by the processor. Example 8 includes the apparatus of any one of examples 1 to 7, wherein the logic circuitry is to execute one or more instructions on a Flexible Collision Library (FCL) to perform the one or more motion planning operations. Example 9 includes the apparatus of any one of examples 1 to 8, wherein each of the plurality of the OBBs is to be 64-byte aligned. Example 10 includes the apparatus of any one of examples 1 to 9, wherein the logic circuitry and the processor are coupled via an interconnect. Example 11 includes the apparatus of any one of examples 1 to 10, wherein the interconnect comprises a Peripheral Component Interconnect express (PCIe) interconnect. Example 12 includes the apparatus of any one of examples 1 to 11, wherein the first memory or the local memory comprise Random Access Memory (RAM), Dynamic RAM (DRAM), or Double Data Rate (DDR) memory. Example 13 includes the apparatus of any one of examples 1 to 12, wherein a robot, a vehicle, a System On Chip (SOC) device, or an Internet of Things (IoT) device comprises one or more of: the logic circuitry, the processor, the local memory, and the first memory. Example 14 includes the apparatus of any one of examples 1 to 13, wherein the vehicle comprises one or more of: an automobile, a truck, a motorcycle, an airplane, a helicopter, a vessel or ship, a train, or a drone. Example 15 includes the apparatus of any one of examples 1 to 14, wherein a single integrated device comprises one or more of: the logic circuitry, the processor, the local memory, and the first memory.

Example 16 includes one or more non-transitory computer-readable medium comprising one or more instructions that when executed on a processor configure the processor to perform one or more operations to: accelerate, at logic circuitry, one or more motion planning operations for a plurality of objects, wherein the one or more motion planning operations are to be initiated by the processor; and store data corresponding to a plurality of Oriented Bounding Boxes (OBBs) in a first memory, wherein the plurality of OBBs are to provide Bounding Volume (BV) models for the plurality of objects. Example 17 includes the one or more computer-readable medium of example 16, wherein a Field-Programmable Gate Array (FPGA) comprises the logic circuitry and a local memory. Example 18 includes the one or more computer-readable medium of any of examples 16 to 17, wherein a portion of data stored in the first memory is to be transferred to the local memory on the FPGA prior to performance of the one or more motion planning operations. Example 19 includes the one or more computer-readable medium of any of examples 16 to 18, wherein the local memory is to store a node stack, wherein the node stack comprises BV node identifier information. Example 20 includes the one or more computer-readable medium of any of examples 16 to 19, wherein the local memory of the FPGA is to cache at least a first 16 OBBs of each of the BV models. Example 21 includes the one or more computer-readable medium of any of examples 16 to 20, wherein the one or more motion planning operations are to be performed in at least two phases, wherein a first phase comprises a coarse collision checking task to be performed for each pair of bodies to determine potential collision between the two bodies, wherein a second phase comprises a precise collision checking task for those pairs of bodies that failed to pass the first phase. Example 22 includes the one or more computer-readable medium of any of examples 16 to 21, wherein the second phase is to be launched for processing by the logic circuitry after processing of the first phase has been completed by the processor. Example 23 includes the one or more computer-readable medium of any of examples 16 to 22, wherein the logic circuitry is to execute one or more instructions on a Flexible Collision Library (FCL) to perform the one or more motion planning operations. Example 24 includes the one or more computer-readable medium of any of examples 16 to 23, wherein each of the plurality of the OBBs is to be 64-byte aligned. Example 25 includes the one or more computer-readable medium of any of examples 16 to 24, wherein a robot, a vehicle, a System On Chip (SOC) device, or an Internet of Things (IoT) device comprises one or more of: the logic circuitry, the processor, the local memory, and the first memory.

Example 16 includes a method comprising: accelerating, at logic circuitry, one or more motion planning operations for a plurality of objects, wherein the one or more motion planning operations are initiated by the processor; and storing data corresponding to a plurality of Oriented Bounding Boxes (OBBs) in a first memory, wherein the plurality of OBBs are to provide Bounding Volume (BV) models for the plurality of objects. Example 17 includes the method of example 16, wherein a Field-Programmable Gate Array (FPGA) comprises the logic circuitry and a local memory. Example 18 includes the method of any of examples 16 to 17, wherein a portion of data stored in the first memory is transferred to the local memory on the FPGA prior to performance of the one or more motion planning operations. Example 19 includes the method of any of examples 16 to 18, wherein the local memory stores a node stack, wherein the node stack comprises BV node identifier information. Example 20 includes the method of any of examples 16 to 19, wherein the local memory of the FPGA caches at least a first 16 OBBs of each of the BV models. Example 21 includes the method of any of examples 16 to 20, wherein the one or more motion planning operations are performed in at least two phases, wherein a first phase comprises a coarse collision checking task to be performed for each pair of bodies to determine potential collision between the two bodies, wherein a second phase comprises a precise collision checking task for those pairs of bodies that failed to pass the first phase. Example 22 includes the method of any of examples 16 to 21, wherein the second phase is launched for processing by the logic circuitry after processing of the first phase has been completed by the processor. Example 23 includes the method of any of examples 16 to 22, wherein the logic circuitry executes one or more instructions on a Flexible Collision Library (FCL) to perform the one or more motion planning operations. Example 24 includes the method of any of examples 16 to 23, wherein each of the plurality of the OBBs is 64-byte aligned. Example 25 includes the method of any of examples 16 to 24, wherein a robot, a vehicle, a System On Chip (SOC) device, or an Internet of Things (IoT) device comprises one or more of: the logic circuitry, the processor, the local memory, and the first memory.

An apparatus comprising means to perform a method as set forth in any preceding example. Machine-readable storage including machine-readable instructions, when executed, to implement a method or realize an apparatus as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
logic circuitry, coupled to a processor, configured to accelerate one or more motion planning operations for a plurality of objects, wherein the one or more motion planning operations are to be initiated by the processor;
a first memory, coupled to the logic circuitry, configured to store data corresponding to a plurality of Oriented Bounding Boxes (OBBs), wherein the plurality of OBBs are to provide Bounding Volume (BV) models for the plurality of objects; and
a local memory configured to store a node stack, wherein the node stack comprises a plurality of BV node identifiers, wherein each of the plurality of BV node identifiers is to comprise an address to an Oriented Bounding Box (OBB) from the plurality of OBBs in the first memory.

2. The apparatus of claim 1, wherein a Field-Programmable Gate Array (FPGA) comprises the logic circuitry and the local memory.

3. The apparatus of claim 2, wherein a portion of data stored in the first memory is to be transferred to the local memory on the FPGA prior to performance of the one or more motion planning operations.

4. The apparatus of claim 1, wherein the local memory of the FPGA is to cache at least a first 16 OBBs of each of the BV models.

5. The apparatus of claim 1, wherein the one or more motion planning operations are to be performed in at least two phases, wherein a first phase comprises a coarse collision checking task to be performed for each pair of bodies to determine potential collision between the two bodies, wherein a second phase comprises a precise collision checking task for those pairs of bodies that failed to pass the first phase.

6. The apparatus of claim 5, wherein the second phase is to be launched for processing by the logic circuitry after processing of the first phase has been completed by the processor.

7. The apparatus of claim 1, wherein the logic circuitry is to execute one or more instructions on a Flexible Collision Library (FCL) to perform the one or more motion planning operations.

8. The apparatus of claim 1, wherein each of the plurality of the OBBs is to be 64-byte aligned.

9. The apparatus of claim 1, wherein the logic circuitry and the processor are coupled via an interconnect.

10. The apparatus of claim 9, wherein the interconnect comprises a Peripheral Component Interconnect express (PCIe) interconnect.

11. The apparatus of claim 1, wherein the first memory or the local memory comprise Random Access Memory (RAM), Dynamic RAM (DRAM), or Double Data Rate (DDR) memory.

12. The apparatus of claim 1, wherein a robot, a vehicle, a System On Chip (SOC) device, or an Internet of Things (IoT) device comprises one or more of: the logic circuitry, the processor, the local memory, and the first memory.

13. The apparatus of claim 12, wherein the vehicle comprises one or more of: an automobile, a truck, a motorcycle, an airplane, a helicopter, a vessel or ship, a train, or a drone.

14. The apparatus of claim 12, wherein a single integrated device comprises one or more of: the logic circuitry, the processor, the local memory, and the first memory.

15. One or more non-transitory computer-readable medium comprising one or more instructions that when executed on a processor configure the processor to perform one or more operations to:
accelerate, at logic circuitry, one or more motion planning operations for a plurality of objects, wherein the one or more motion planning operations are to be initiated by the processor;
store data corresponding to a plurality of Oriented Bounding Boxes (OBBs) in a first memory, wherein the plurality of OBBs are to provide Bounding Volume (BV) models for the plurality of objects; and
store a node stack in a local memory, wherein the node stack comprises a plurality of BV node identifiers, wherein each of the plurality of BV node identifiers is to comprise an address to an Oriented Bounding Box (OBB) from the plurality of OBBs in the first memory.

16. The one or more computer-readable medium of claim 15, wherein a Field-Programmable Gate Array (FPGA) comprises the logic circuitry and the local memory.

17. The one or more computer-readable medium of claim 16, wherein a portion of data stored in the first memory is to be transferred to the local memory on the FPGA prior to performance of the one or more motion planning operations.

18. The one or more computer-readable medium of claim 15, wherein the local memory of the FPGA is to cache at least a first 16 OBBs of each of the BV models.

19. The one or more computer-readable medium of claim 15, wherein the one or more motion planning operations are to be performed in at least two phases, wherein a first phase comprises a coarse collision checking task to be performed for each pair of bodies to determine potential collision between the two bodies, wherein a second phase comprises a precise collision checking task for those pairs of bodies that failed to pass the first phase.

20. The one or more computer-readable medium of claim 19, wherein the second phase is to be launched for processing by the logic circuitry after processing of the first phase has been completed by the processor.

21. The one or more computer-readable medium of claim 15, wherein the logic circuitry is to execute one or more instructions on a Flexible Collision Library (FCL) to perform the one or more motion planning operations.

22. The one or more computer-readable medium of claim 15, wherein each of the plurality of the OBBs is to be 64-byte aligned.

23. The one or more computer-readable medium of claim 15, wherein a robot, a vehicle, a System On Chip (SOC) device, or an Internet of Things (IoT) device comprises one or more of: the logic circuitry, the processor, the local memory, and the first memory.

* * * * *